March 8, 1949.  B. E. LUBOSHEZ  2,464,139
NONINTERMITTENT MOTION-PICTURE APPARATUS
Filed March 19, 1947

BENJAMIN E. LUBOSHEZ
INVENTOR

BY
ATTORNEYS

Patented Mar. 8, 1949

2,464,139

UNITED STATES PATENT OFFICE 2,464,139

NONINTERMITTENT MOTION-PICTURE APPARATUS

Benjamin E. Luboshez, Rochester, N. Y., assignor to Eastman Kodak Company, Rochester, N. Y., a corporation of New Jersey Application March 19, 1947, Serial No. 735,731

5 Claims. (Cl. 88—16.8)

This invention relates to apparatus for taking or projecting motion pictures and more particularly to such apparatus in which the film is moved continuously rather than intermittently and the film movement is compensated optically by rotating a plane parallel plate in the light path between the objective and the film.

It is well known to rotate a simple plane parallel plate between a lens and a moving film to compensate for the movement of the film. It is equally well known that the compensation provided by such an arrangement is not a linear function of the angle through which the plate rotates and is satisfactory only over small angles from the orthogonal position.

The primary object of the present invention is the provision of an optical compensator of the rotating parallel plate type in which the displacement of a light beam is a linear function of the angular movement of such plate.

Another object of the invention is the provision of an optical compensating plate the thickness of which is variable.

A further object of the invention is the provision of motion picture apparatus in which the film is moved continuously and is satisfactorily compensated over a large angle by a uniformly rotating plate.

Figure 1:
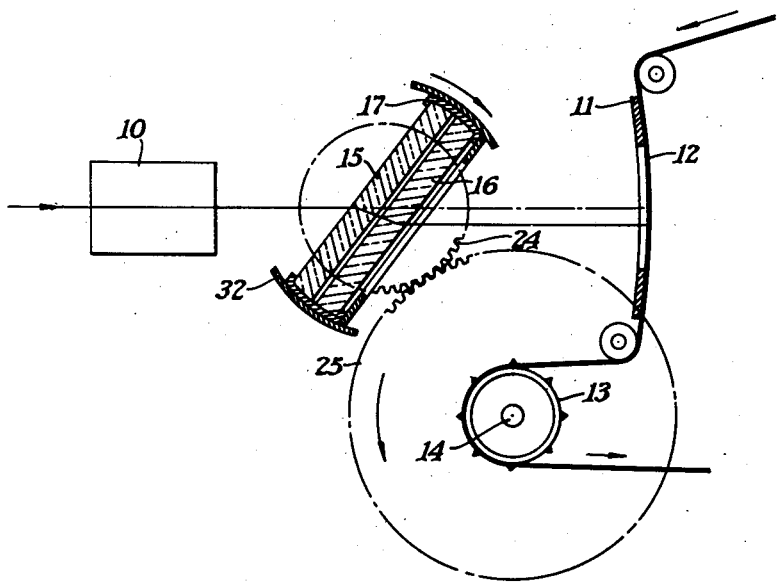
Figure 2:
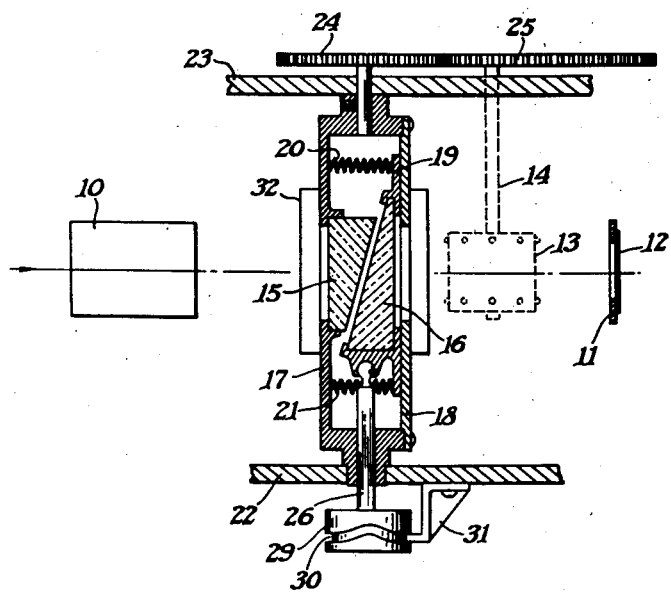

Other objects and advantages of the invention will be apparent from the following description when read in connection with the accompanying drawing in which:

Fig. 1 is a diagrammatic view in side elevation and partly in section showing a motion picture apparatus embodying the invention; and Fig. 2 is a plan view in section showing details of the variable thickness plate of the invention.

The general type of apparatus in which the invention is useful is shown in Fig. 1 as including an objective lens 10 having at its focal plane a window 11 past which a film 12 is adapted to be uniformly advanced by suitable means such as a sprocket 13 secured to a shaft 14. In accordance with the invention the movement of the film 12 is compensated by rotating in the light beam between the objective 10 and the film 12 the equivalent of a single plane parallel plate whose thickness is varied in synchronism with the angle through which it is rotated so as to maintain a linear relation between displacement and angle of rotation. The thickness of the plate may be made variable in any suitable manner, one simple way being to make the plate in the form of two or more wedge shaped components having no deviating power and which are moved relatively to each other in the direction of the wedge angles.

One form of variable plate according to the invention is shown in Figs. 1 and 2 as comprising two wedge shaped prisms 15 and 16 having identical apex angles and parallel outer faces mounted in a box 17 having a lid 18 suitably secured thereto. The prism 15 is fixed in the box 17 while the prism 16 is held in a frame 19 which is slidable on the inside surface of the lid 18 and held in contact therewith by suitable springs 20 and 21. The box 17 is suitably journaled in walls 22 and 23 for rotation about an axis perpendicular to the optical axis of the objective 10. One journal of the box 17 extends through the wall 23 and has secured thereto a gear wheel 24 which meshes with a gear wheel 25 carried by the sprocket shaft 14 so that when either gear wheel 24 or 25 is driven by any means, not shown, the sprocket 14 and the box 17 will be rotated in synchronism.

To obtain the slight movement of the prism 16 required to provide the necessary variation in thickness of the plate comprised of prisms 15 and 16, a square sectioned bar 26 extending through the end of the box 17 journaled in the wall 22 is secured at one end to the slideable frame 19 as by a ball 27 and a socket 28 and carries at its other end a drum 29 provided with a cam groove 30 which cooperates with a fixed member 31 secured to the wall 22. The shape of the cam groove 30 or other means for obtaining the required movement of the prism 16 depends upon the combined thickness of the two prisms 15 and 16, the angle of their apices and the index of refraction of the glass used and can readily be calculated by one skilled in the art.

A single plate of a thickness $t$ and index of refraction $N$ will when rotated through an angle $\theta$ from its orthogonal position give a displacement $h$ as follows:

$$h = t \cdot \sin(\theta - \phi) / \cos \phi$$

where $\phi$ is given by $$\sin \theta = N \cdot \sin \phi$$

Clearly, displacement is not proportional to $\theta$ but according to the invention is made so by suitably varying $t$ to provide that $$h = K \cdot \theta$$

and once the constant $K$ has been determined for a given angle $\theta$, all the values of $t$ for all desired values of $\theta$ can be determined by the equation:

$$t = K. \theta \cos \phi / \sin(\theta - \phi)$$

From the above description it will be evident that the prisms 15 and 16 will function the same as a single plane parallel plate whose thickness is variable to produce uniform displacement of a light beam when rotated with uniform angular velocity. Light loss at the four air to glass surfaces is preferably reduced by treating all surfaces with non-reflecting layers. Suitable shutter means may be provided to interrupt the light beam during inoperative positions of the compensator. A barrel type shutter 32 is illustrated.

It will be appreciated that the drawing has been made largely diagrammatic with omission of all parts of a complete apparatus not necessary to a ready understanding of the invention. Although the direction indicated for the light beam in the drawing represents a camera construction it is obvious that the optical compensating arrangement of the invention is equally applicable to projection or other apparatus where it is desired to obtain uniform displacement of a light beam by means of a uniformly rotating part. Various modifications will suggest themselves to those skilled in the art and all such modifications are intended to be included within the scope of the appended claims.

I claim:

1. In motion picture apparatus in which a film is moved uniformly through the focal plane of an objective, an optical compensator in the light path between the objective and the film comprising a pair of similar wedge shaped prisms disposed in relatively reversed position perpendicular to the light beam and relatively movable to vary the effective combined thickness of the prisms, means for rotating said compensator with a uniform angular velocity, and means for imparting relative movement to said prisms in timed relation with their rotation.

2. In an optical rectifying system for displacing a light beam at a desired uniform rate, a uniformly rotatable light displacing member comprising an assembly of prism elements arranged to have zero deviating power, at least one of the prism elements being movable in the direction which varies the optical thickness of the assembly, and means for rotating said member and for reciprocating said movable element in timed relation.

3. In motion picture apparatus in which the film is moved uniformly, an optical rectifier for compensating for the movement of the film comprising two wedge shaped prisms arranged in zero deviating power relationship and with their outer faces parallel, a support for said prisms rotatable about an axis parallel to said outer faces, and means for reciprocating one of said prisms in the direction of its wedge angle in accordance with the angular position of the rotatable support.

4. An optical compensating device for displacing a light beam at a uniform rate comprising a rotatable light displacing member consisting of two equal power optical wedges in zero light deviating relation and having a light displacing power dependent upon the combined thickness of the wedges, means for rotating said member at a constant angular speed, and means for imparting relative movement to said wedges to vary their combined thickness as a function of the square of the angle said member departs from its orthogonal position in the light beam.

5. An optical compensating device for displacing a light beam to follow a uniformly moving film comprising a plane parallel refracting member rotatable in the light beam and having a part movable for varying the thickness of said member, means for rotating said member with uniform angular velocity, and means for moving said movable part to maintain the thickness of said member substantially equal to a constant times $\theta \cos \phi / \sin (\theta - \phi)$ where $\theta$ is the angle between said rotating member and its orthogonal position and $\phi$ is the corresponding angle of refraction.

BENJAMIN E. LUBOSHEZ.

REFERENCES CITED

The following references are of record in the file of this patent:

UNITED STATES PATENTS

| Number | Name | Date |
|--------|------|------|
| 695,916 | Dickson | Mar. 25, 1902 |
| 1,699,169 | Thurstone | Jan. 15, 1929 |